(12) United States Patent
Lim

(10) Patent No.: US 8,748,021 B2
(45) Date of Patent: Jun. 10, 2014

(54) BATTERY MODULE

(75) Inventor: Young-Bin Lim, Yongin-si (KR)

(73) Assignees: Samsung SDI Co., Ltd., Yongin-si (KR); Robert Bosch GmbH, Stuttgart (DE)

(*) Notice: Subject to any disclaimer, the term of this patent is extended or adjusted under 35 U.S.C. 154(b) by 0 days.

(21) Appl. No.: 12/977,861

(22) Filed: Dec. 23, 2010

(65) Prior Publication Data

US 2012/0094155 A1 Apr. 19, 2012

Related U.S. Application Data

(60) Provisional application No. 61/394,689, filed on Oct. 19, 2010.

(51) Int. Cl.
*H01M 2/12* (2006.01)
(52) U.S. Cl.
CPC .............. *H01M 2/12* (2013.01); *H01M 2/1211* (2013.01); *Y02E 60/12* (2013.01)
USPC ................ 429/82; 429/72; 429/163; 429/175
(58) Field of Classification Search
CPC .............................. H01M 2/1205; H01M 2/12
USPC ...................... 429/82, 148–187, 72
See application file for complete search history.

(56) References Cited

U.S. PATENT DOCUMENTS

| | | | |
|---|---|---|---|
| 1,922,082 A * | 8/1933 | Dunzweiler | 429/187 |
| 4,562,126 A * | 12/1985 | Chartrain et al. | 429/72 |
| 5,256,502 A | 10/1993 | Kump | |
| 6,197,446 B1 * | 3/2001 | Fukuda et al. | 429/163 |
| 6,569,561 B1 | 5/2003 | Kimura et al. | |
| 2005/0147874 A1 * | 7/2005 | Andersen et al. | 429/87 |
| 2009/0047574 A1 * | 2/2009 | Hellmann | 429/121 |
| 2010/0081048 A1 * | 4/2010 | Nansaka et al. | 429/158 |
| 2010/0092859 A1 * | 4/2010 | Kim et al. | 429/178 |
| 2011/0104556 A1 * | 5/2011 | Kim et al. | 429/160 |

FOREIGN PATENT DOCUMENTS

| | | |
|---|---|---|
| CN | 1300107 A | 6/2001 |
| EP | 1 059 679 A2 | 12/2000 |
| JP | 58-103787 | 6/1983 |
| KR | 10-2003-0017821 | 3/2003 |
| KR | 10-2008-0022423 | 3/2008 |
| KR | 10-2008-0054097 | 6/2008 |

OTHER PUBLICATIONS

European Search Report dated Oct. 31, 2011, for corresponding European Patent application 11173734.2, noting listed references in this IDS, 4 pages.
SIPO Office action dated Nov. 18, 2013, for corresponding Chinese Patent application 201110126420.0 (7 pages), and English Translation (9 pages).

* cited by examiner

*Primary Examiner* — Patrick Ryan
*Assistant Examiner* — Alex Usyatinsky
(74) *Attorney, Agent, or Firm* — Christie, Parker & Hale, LLP

(57) ABSTRACT

A battery module including a plurality of battery cells arranged in a first direction from a first end of the battery module to a second end of the battery module, each of the battery cells including a case including a vent, an electrode assembly housed in the case, and a terminal electrically coupled to the electrode assembly; a bus bar coupled between the terminals of adjacent battery cells of the plurality of battery cells; and a battery module cover covering the plurality of battery cells and including a degassing cover covering the vents of the plurality of battery cells, and a bus bar cover covering the terminals of the plurality of battery cells and the bus bar.

15 Claims, 8 Drawing Sheets

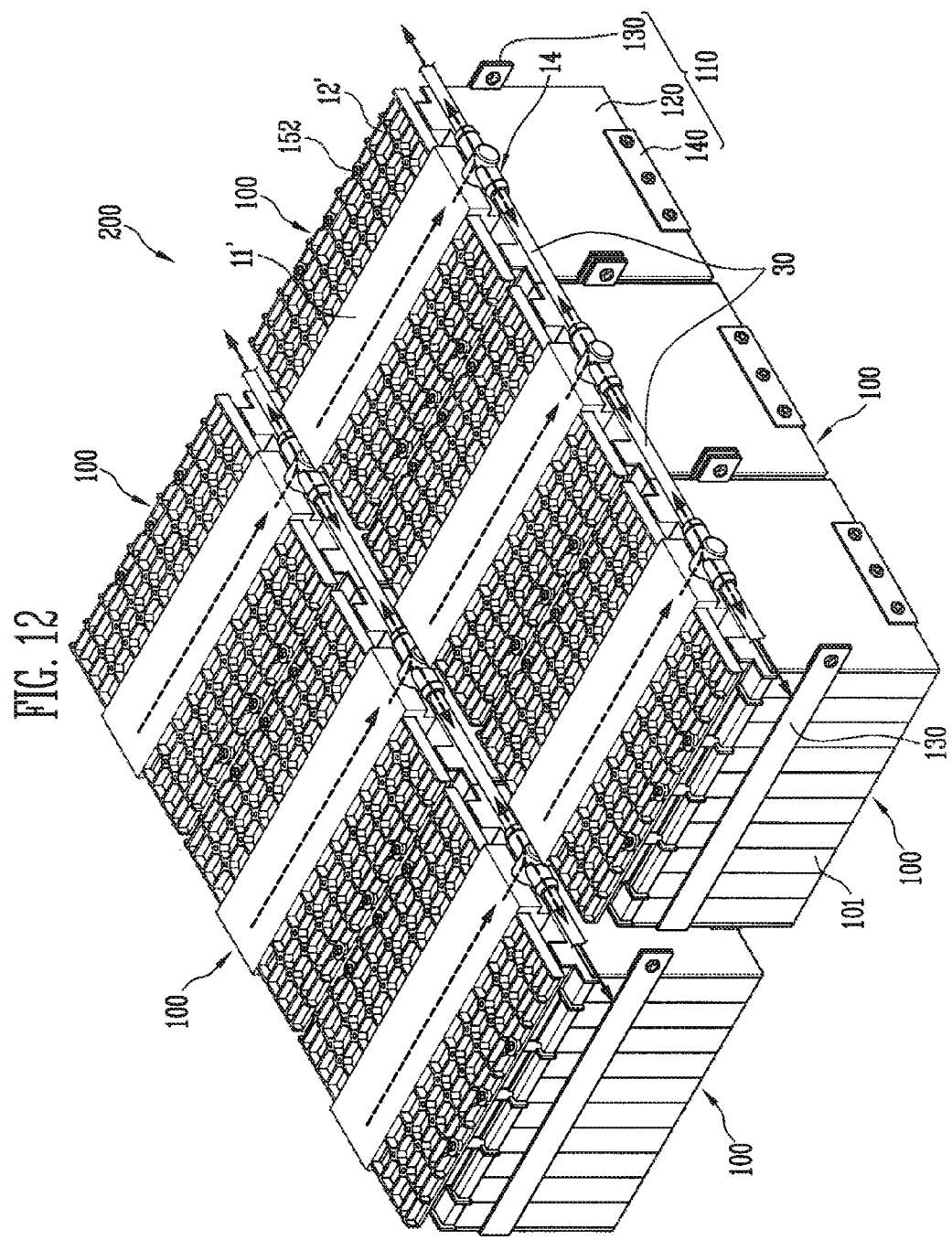

BATTERY MODULE

CROSS-REFERENCE TO RELATED APPLICATION

This application claims priority to and the benefit of U.S. Provisional Application No. 61/394,689, filed on Oct. 19, 2010 in the United States Patent and Trademark Office, the entire content of which is incorporated herein by reference.

BACKGROUND

1. Field

Aspects of embodiments of the present invention relate to a battery module having a plurality of battery cells.

2. Description of the Related Art

Recently, a high-output battery module using a non-aqueous electrolyte having a high energy density has been developed. The high-output battery module is formed to have high capacity by constituting a plurality of battery cells connected in series so that the battery module may be used to drive a motor of a device using high power, such as an electric vehicle.

A battery cell includes an electrode assembly constituted by a positive plate and a negative plate, and an electrolyte, and generates energy by an electrochemical reaction of the plates with the electrolyte. Here, gas may be generated in the battery cell due to a side reaction of the electrochemical reaction. Thus, a path or a vent for the gas may be formed in the battery module in order to efficiently treat the gas generated in a plurality of battery cells.

SUMMARY

According to an aspect of embodiments of the present invention, a battery module cover improves assembly of a plurality of battery cells.

Further, according to another aspect of embodiments of the present invention, a battery module has a structure for reliably preventing or reducing leakage of gas generated in a plurality of battery cells.

According to an embodiment of the present invention, a battery module includes: a plurality of battery cells arranged in a first direction from a first end of the battery module to a second end of the battery module, each of the battery cells including a case including a vent, an electrode assembly housed in the case, and a terminal electrically coupled to the electrode assembly; a bus bar coupled between the terminals of adjacent battery cells of the plurality of battery cells; and a battery module cover covering the plurality of battery cells and including a degassing cover covering the vents of the plurality of battery cells, and a bus bar cover covering the terminals of the plurality of battery cells and the bus bar.

The degassing cover and the bus bar cover may be integrally formed. In one embodiment, the degassing cover includes at least one protrusion extending from a surface of the degassing cover facing the plurality of battery cells, the at least one protrusion defining a cavity covering the vents of the plurality of battery cells. In one embodiment, the degassing cover further includes an exhaust part extending from the degassing cover at the first end of the battery module, and the at least one protrusion has an opening between the cavity and the exhaust part. The exhaust part may include a first exhaust portion extending from the degassing cover; and at least one second exhaust portion extending from the first exhaust portion in a direction perpendicular to the first exhaust portion, the at least one second exhaust portion having an exhaust opening at an end thereof.

In one embodiment, a battery module further includes insulating members adjacent the vents, and the at least one protrusion contacts the insulating members. In one embodiment, the at least one protrusion includes a first pair of ribs extending in the first direction and a second pair of ribs between the first pair of ribs and extending in the first direction.

In one embodiment, a battery module further includes a housing receiving the plurality of battery cells, the housing including a pair of end plates contacting outermost battery cells of the plurality of battery cells at the first and second ends of the battery module; and a connecting member extending in the first direction and coupling the end plates to each other. An end plate of the pair of end plates may include a projection extending toward the battery module cover and having an opening formed therein, the opening receiving an exhaust part extending from the degassing cover at the first end of the battery module. The battery module cover may have an accommodation space at at least one of the first and second ends of the battery module and spaced apart from the cavity, and the projection of the end plate may be received in the accommodation space.

The battery module cover may include a plurality of ribs intersecting one another at reinforcing portions on a surface of the battery module cover. In one embodiment, the bus bar cover includes a first bus bar cover portion extending from a side of the degassing cover; and a second bus bar cover portion extending from an opposite side of the degassing cover.

In one embodiment, a battery module further includes an upper cover mounted between the plurality of battery cells and the battery module cover, the upper cover including at least one coupling member coupling the battery module cover to the plurality of battery cells. The upper cover may further include a pair of isolation layers extending toward the battery module cover and along the first direction on opposite sides of the vents, wherein the isolation layers support the battery module cover.

According to another embodiment of the present invention, a battery module cover includes: a degassing cover including at least one protrusion extending from a first surface of the degassing cover, the at least one protrusion defining a cavity, and an exhaust part extending from an end of the degassing cover, the at least one protrusion having an opening between the cavity and the exhaust part; and a bus bar cover including a first bus bar cover portion extending from a first side of the degassing cover, and a second bus bar cover portion extending from a second side of the degassing cover opposite the first side.

The degassing cover and the bus bar cover may be integrally formed. In one embodiment, the exhaust part includes a first exhaust portion extending from the degassing cover; and a pair of second exhaust portions extending from the first exhaust portion in directions perpendicular to the first exhaust portion and opposite each other, the second exhaust portions having exhaust openings at ends thereof. The bus bar cover may further include a plurality of ribs intersecting one another at reinforcing portions on a surface of the bus bar cover.

According to another embodiment of the present invention, a battery pack includes: a plurality of battery modules arranged in a row and each including a plurality of battery cells arranged in a first direction from a first end of the battery module to a second end of the battery module, each of the battery cells including a case including a vent, an electrode assembly housed in the case, and a terminal electrically coupled to the electrode assembly; a bus bar coupled between the terminals of adjacent battery cells of the plurality of battery cells; and a battery module cover covering the plurality of battery cells and including a degassing cover covering the vents of the plurality of battery cells and including an exhaust part at the first end of the battery module; and a bus bar cover covering the terminals of the plurality of battery cells and the bus bar, and the exhaust parts of adjacent battery modules of the plurality of battery modules are connected to one another.

In one embodiment, the exhaust part includes a first exhaust portion extending from the degassing cover; and a pair of second exhaust portions extending from the first exhaust portion in directions perpendicular to the first exhaust portion and opposite each other, the second exhaust portions having exhaust openings at ends thereof, and the battery pack further includes a connection member extending between respective exhaust openings of the adjacent battery modules.

According to another embodiment of the present invention, a battery module includes a pair of end plates; at least one battery cell arranged in one direction between the pair of end plates; a connecting member to connect the pair of end plates; and a battery module cover to cover an upper part of the at least one battery cell, the battery module cover including a degassing cover corresponding to a vent of the battery cell and a bus bar cover extending from the degassing cover to opposite sides and formed integrated, and the degassing cover including an exhaust part protruding therefrom.

The degassing cover of the battery module cover may seal the vent of the battery cell or an insulating member disposed on the vent to form an inside space where gas flows.

The degassing cover may include a first extension part and a second extension part which extend parallel with the pair of end plates to the vent of the battery cell, wherein an inside discharge hole is formed in one of the first extension part and the second extension part, and an exhaust part communicating with the inside discharge hole is formed to protrude on an outside of one of the first extension part and the second extension part.

Further, the degassing cover may include at least one pair of walls closely disposed to the bent or the insulating member disposed on the vent to form a path of gas, wherein the pair of walls is formed to extend between the first extension part and the second extension part.

The walls may include a pair of first walls and a pair of second walls disposed inside the first walls.

The exhaust part formed to protrude on an outside of the degassing cover may have a "T" shape in which a first member has one closed end portion and a second member extends on opposite sides of the first member in a perpendicular direction to the first member and in a parallel direction with the end plates and has each end portion formed with an outside discharge hole.

The bus bar cover may include at least one insertion hole into which a coupling component for coupling with the battery module is inserted.

A first accommodation wall and a second accommodation wall may be formed adjacently to the first extension part and the second extension part, respectively, a first accommodation space may be formed between the first extension part and the first accommodation wall, and a second accommodation space may be formed between the second extension part and the second accommodation wall.

A projection formed on the pair of end plates may be inserted into the first accommodation space and the second accommodation space.

The projection inserted into the first accommodation space may include a coupling hole communicating with the inside discharge hole formed in the first extension part.

According to another aspect of the present invention, a bus bar cover of a battery module cover includes a plurality of first levees, a plurality of second levees perpendicular to the first levees, and a reinforced protrusion formed on an intersection portion of the first levees and the second levees.

The insulating member disposed on the vent of the battery cell may be formed to be larger than the plurality of walls.

The battery module may include a bus bar connecting terminals of the respective battery cells, wherein the bus bar may be isolated from an adjacent bus bar, and each bus bar may be surrounded by a blocking wall.

A pair of isolation layers may be formed on opposite sides of the vent or the insulating member disposed on the vent to support the battery module cover from a bottom.

A fixing member may be formed on one side of the blocking wall to fix the coupling component inserted into the insertion hole.

The blocking wall, the pair of isolation layers, and the fixing member may be formed to constitute an upper cover in an integrated form.

According to still another embodiment of the present invention, a battery pack includes a plurality of battery modules arranged in a row; a battery module cover covering the respective battery modules and including a degassing cover and a bus bar cover formed in an integrated form; a T-shaped exhaust part formed to protrude on the degassing cover; and a communicating member (e.g., a pipe) connecting outside discharge holes formed in the exhaust part to each other.

As described above, according to an aspect of exemplary embodiments of the present invention, a battery module uses fewer components in assembling a plurality of battery cells and improves assembling efficiency, so that productivity of the battery module is enhanced.

Further, according to another aspect of exemplary embodiments of the present invention, a battery module prevents or reduces leakage of gas to improve sealing ability.

BRIEF DESCRIPTION OF THE DRAWINGS

The accompanying drawings, together with the specification, illustrate some exemplary embodiments of the present invention, and, together with the description, serve to explain the principles of the present invention.

FIG. 12 is a schematic top perspective view of a battery pack in which a plurality of battery modules are connected according to an exemplary embodiment of the present invention.

DETAILED DESCRIPTION

Figure 1:
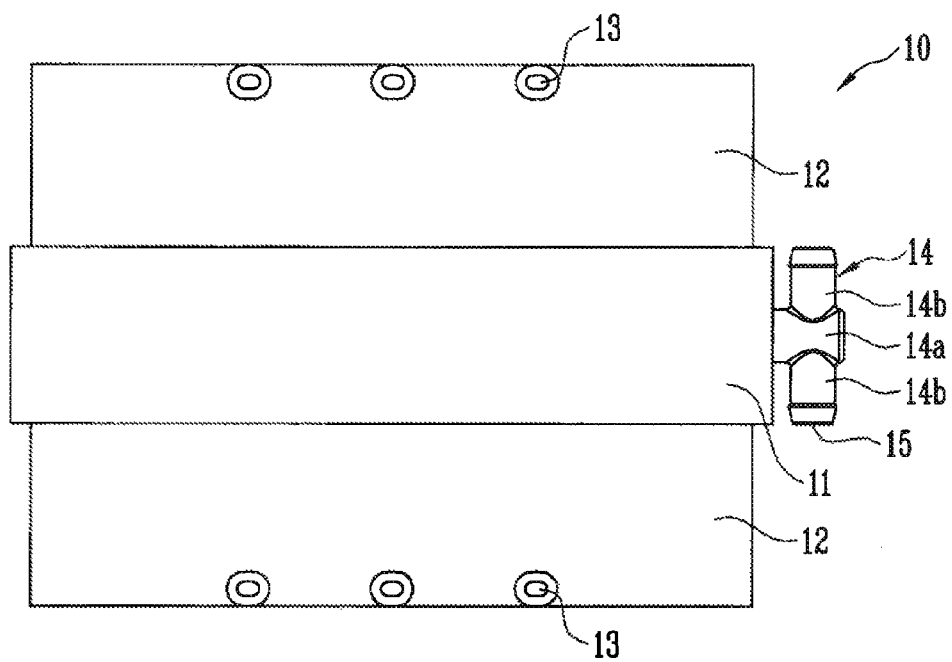
FIG. 1 is a top view of a battery module cover according to an exemplary embodiment of the present invention.

Reference will now be made in detail to some exemplary embodiments of the present invention, examples of which are illustrated in the accompanying drawings. These exemplary embodiments are described below in order to explain aspects of the present invention with reference to the exemplary embodiments shown in the drawings. The present invention may, however, be embodied in many different forms and should not be construed as limited to the exemplary embodiments set forth herein. Rather, these exemplary embodiments are provided in order to convey the scope of the invention to those skilled in the art. In the drawings, like reference numerals refer to like elements throughout, and the size and relative sizes of layers and regions may be exaggerated for clarity.

Figure 2:
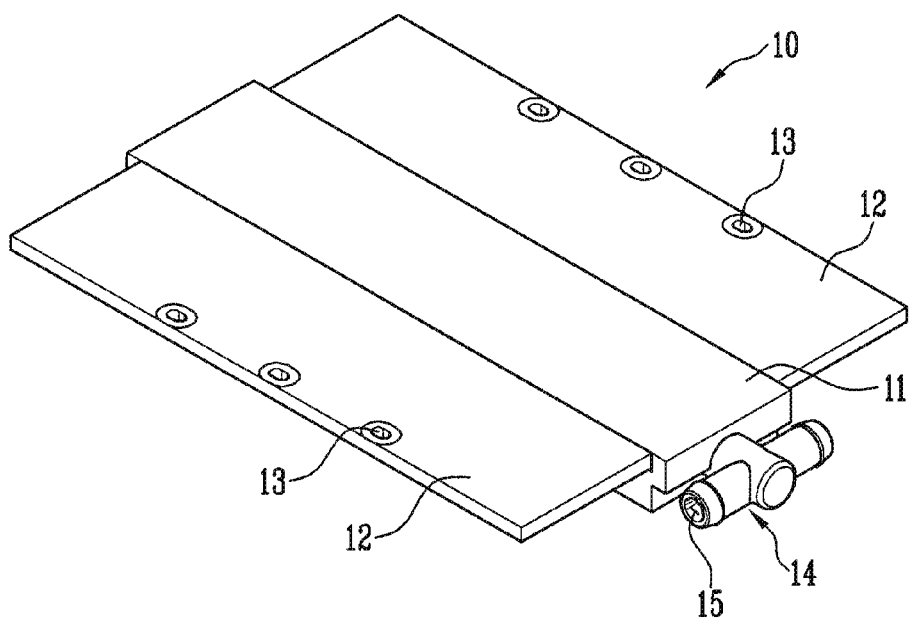
FIG. 2 is a top perspective view of the battery module cover of FIG. 1.
Figure 3:
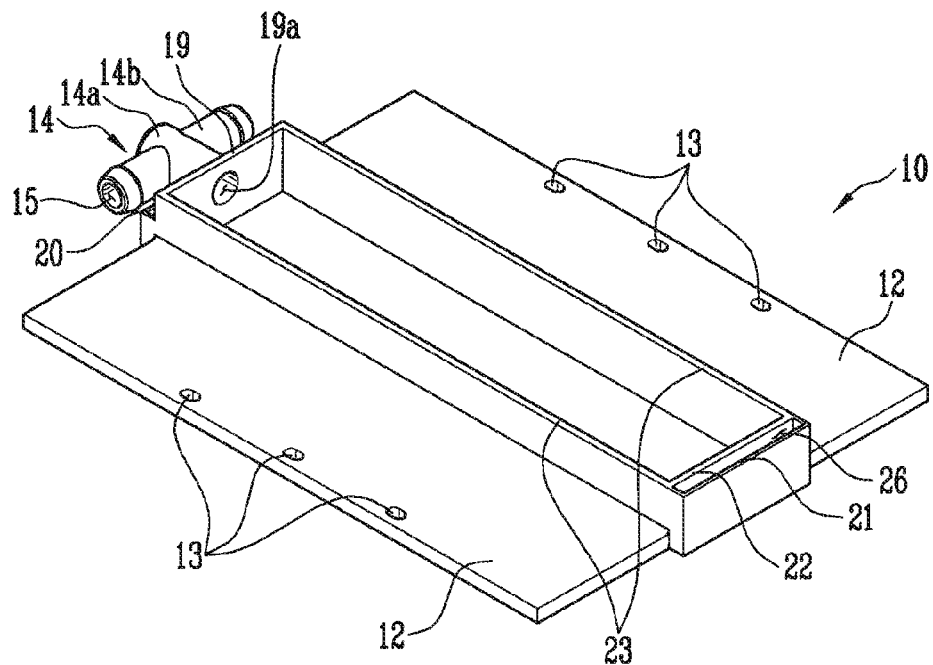
FIG. 3 is a bottom perspective view of the battery module cover of FIG. 1.
Figure 4:
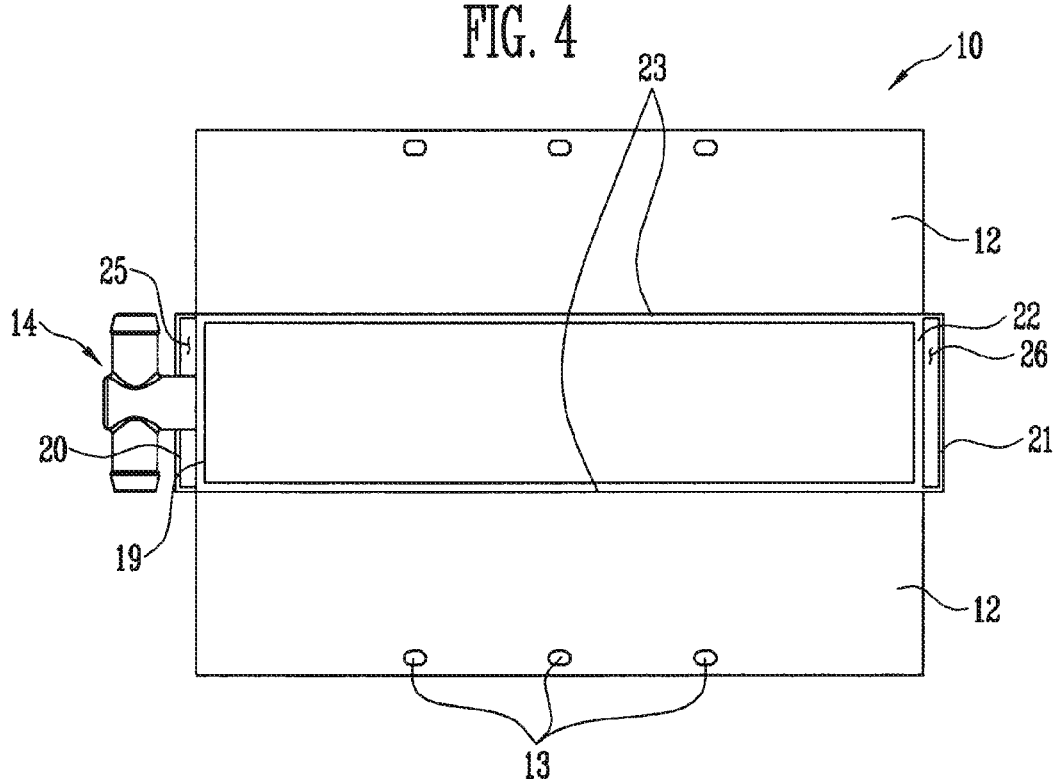
FIG. 4 is a bottom view of the battery module cover of FIG. 1.

FIG. 1 is a top view of a battery module cover, or an integrated degassing cover, according to an exemplary embodiment of the present invention. FIGS. 2 and 3 are, respectively, a perspective view of a top side and a perspective view of a bottom side of the battery module cover shown in FIG. 1, and FIG. 4 is a bottom view of the battery module cover shown in FIG. 1.

Referring to FIGS. 1 to 4, a battery module cover 10 according to an exemplary embodiment of the present invention includes a degassing cover 11 assembled and mounted corresponding to a vent included in at least one battery cell, and a bus bar cover 12 assembled and mounted corresponding to an area where at least one bus bar is positioned. The degassing cover 11 is disposed on an upper part of the vent where the at least one battery cell is arranged and which is disposed in an upper part of each battery, and the bus bar cover 12 is formed to extend from opposite sides of the degassing cover 11 to cover an area where at least one bus bar connects electrodes of at least one battery cell to each other. While according to a conventional method, a degassing cover and a bus bar cover are separately mounted, the battery module cover 10 according to the present embodiment includes the degassing cover 11 and the bus bar cover 12 formed in an integrated manner to decrease a number of components and to improve assembling efficiency.

In one embodiment, the battery module cover 10 includes an insertion hole 13 in at least one of the degassing cover 11 and the bus bar cover 12 to be coupled with an upper part of a battery module using a coupling component, such as a bolt. A plurality of the insertion holes 13 may be formed on one side of the bus bar cover 12.

The degassing cover 11 is disposed on the upper part of the vent which is a discharge path of gas generated in the battery cell. An exhaust part 14 is formed to protrude at an outside lateral side of the degassing cover 11 to safely discharge gas discharged from the vent to the outside of the battery module. That is, the degassing cover 11 is securely fixed to the upper part of the vent, or when an insulating member, such as a gasket, is disposed on the upper part of the vent, the degassing cover 11 is securely fixed to an upper part of the insulating member, and thus a gas path is formed to enable gas discharged from the vent to be safely discharged in one direction.

As shown in FIGS. 3 and 4, in one embodiment, the degassing cover 11 includes a first extension part 19 on a first side (e.g., a front side) where the exhaust part 14 protrudes, a second extension part 22 on a second side (e.g., a rear side) opposite to the first extension part 19, and a pair of first walls 23 extending between the first and second extension parts 19 and 22, each extending toward the vent of the battery cell. Thus, the first and second extension parts 19 and 22 and the pair of first walls 23 are secured to the vent of the battery module or the insulating member disposed on the upper part of the vent, thereby forming a space or path in which gas flows. An inside discharge hole 19a is formed in the first extension part 19, and the exhaust part 14 communicating with the inside discharge hole 19a protrudes outside the first extension part 19. Thus, gas generated in the battery cell and discharged from the vent passes through the inside discharge hole 19a in one direction along the path where the gas flows and is safely discharged to the outside through the exhaust part 14.

When the battery cell is repeatedly charged and discharged, the battery cell generally generates gas owing to byproducts of electrode plates and an electrolyte, and the gas may be discharged through the vent. Since gas discharged through the exhaust part 14 may damage a neighboring battery module or a neighboring battery cell, it is important to prevent or substantially prevent the gas from flowing to the neighboring battery module or the battery cell. Thus, the exhaust part 14, in one embodiment, has a shape in which a first member 14a extends in a parallel direction with the path of gas and has one closed end portion and a second member 14b extends on opposite sides of the first member 14a in a perpendicular direction to the first member 14a and has opposite end portions formed with outside discharge holes 15. That is, in one embodiment, the exhaust part 14 has a "T" shape formed of the first member 14a and the second member 14b formed to extend on the opposite sides of the first member 14a perpendicular to the first member 14a, and gas generated in the vent passes through the inside discharge hole 19a and is safely discharged to left and right sides parallel with an end plate through the outside discharge holes 15.

As described above, the degassing cover 11 of the battery module cover 10 according to one embodiment includes the first walls 23 formed to extend to the vent between the first and second extension parts 19 and 22. The first walls 23 are securely fixed to or secured against the upper part of the vent, or in an embodiment in which an insulating member, such as a gasket, is disposed on the upper part of the vent, the walls 23 are securely fixed to or secured against an upper part of the insulating member, and thus gas may flow in one direction.

As shown in FIGS. 3 and 4, in one embodiment, the battery module cover 10 further includes first and second accommodation walls 20 and 21 adjacent to the first and second extension parts 19 and 22, respectively, to be coupled and mounted with the end plate of the battery module. That is, in one embodiment, the first accommodation wall 20 and the second accommodation wall 21 are formed outside the degassing cover 11 of the battery module cover 10 adjacent to the first extension part 19 and the second extension part 22, respectively. Here, a first accommodation space 25 is formed between the first extension part 19 and the first accommodation wall 20, and a second accommodation space 26 is formed between the second extension part 22 and the second accommodation wall 21. The first and second accommodation spaces 25 and 26, in one embodiment, are coupled with and receive the end plate.

Figure 5:
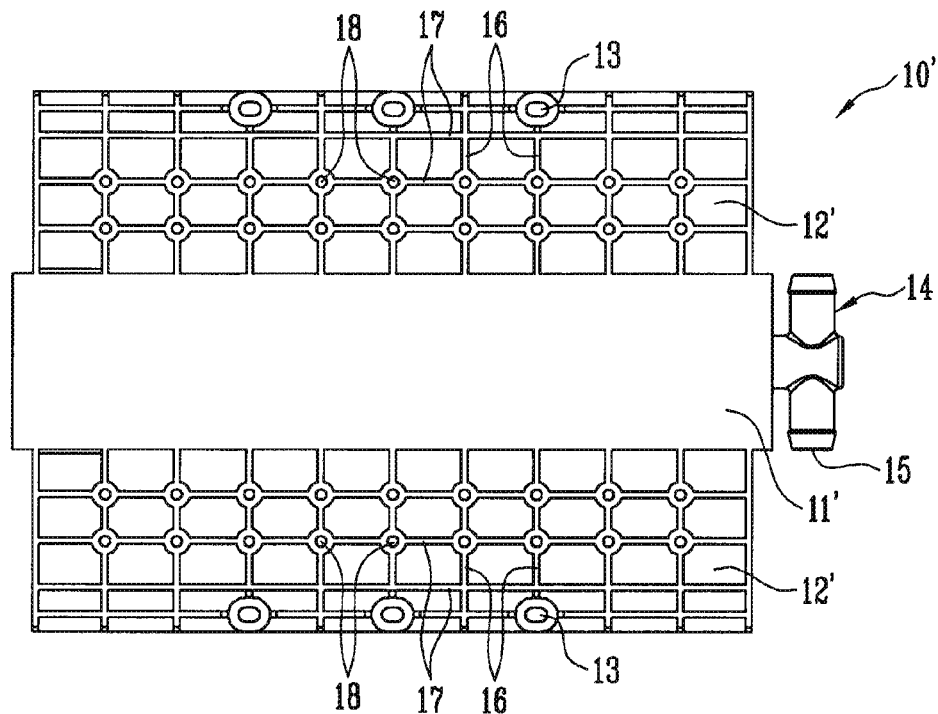
FIG. 5 is a top view of a battery module cover according to another exemplary embodiment of the present invention.
Figure 6:
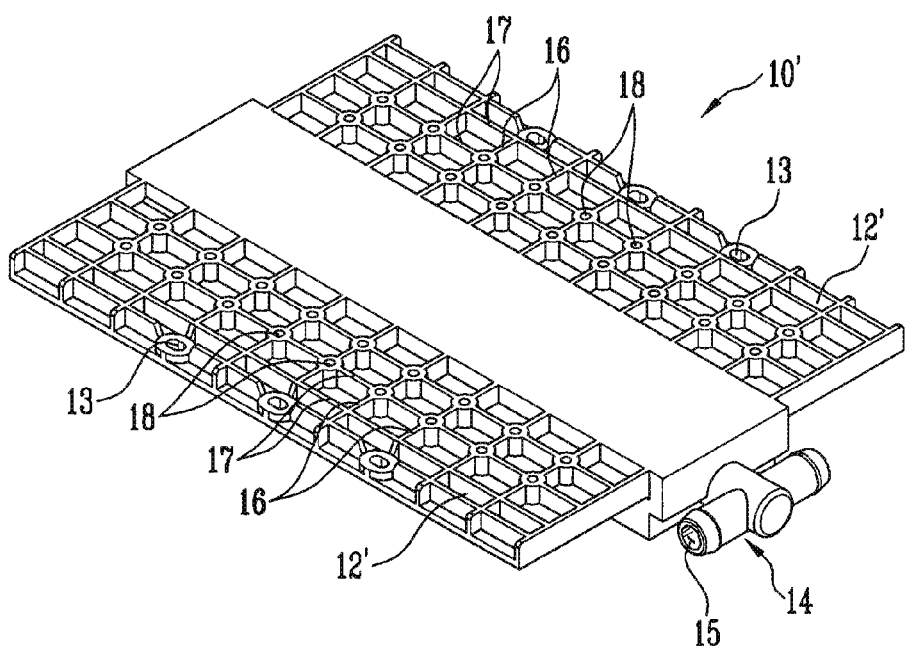
FIG. 6 is a top perspective view of the battery module cover of FIG. 5.
Figure 7:
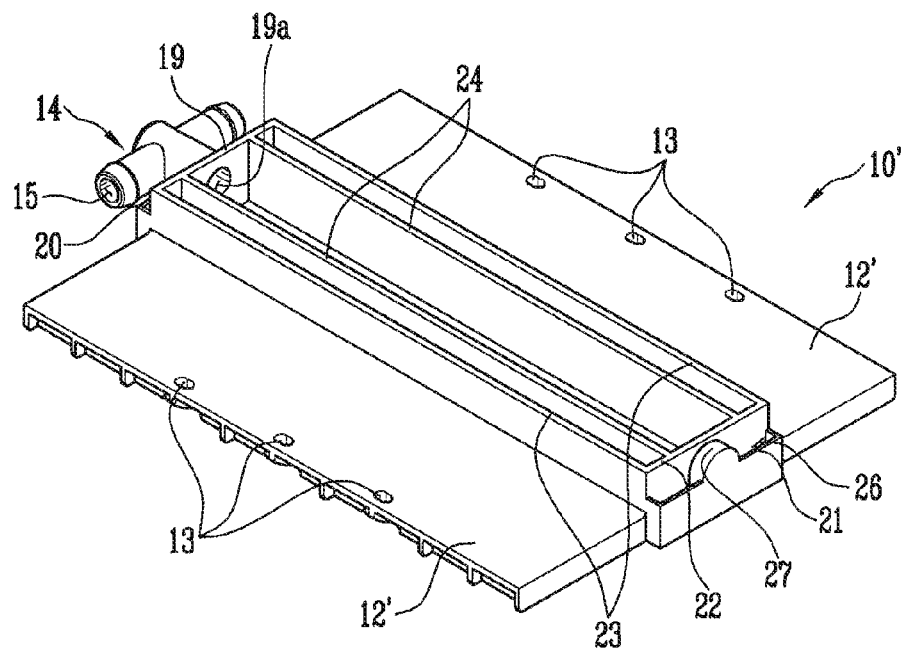
FIG. 7 is a bottom perspective view of the battery module cover of FIG. 5.

FIG. 5 is a top view of a battery module cover, or an integrated degassing cover, according to another exemplary embodiment of the present invention. FIGS. 6 and 7 are perspective views of a top side and a bottom side, respectively, of the battery module cover shown in FIG. 5, and FIG. 8 is a bottom view of the battery module cover shown in FIG. 5.

As shown in FIGS. 5 and 6, in a battery module cover 10' according to another exemplary embodiment, a bus bar cover 12' extending from opposite sides of a degassing cover 11' is formed to be thin, and one or more reinforcing members are formed to increase the strength of the bus bar cover 12'. In one embodiment, a plurality of first levees, or ribs, 16 and a plurality of second levees, or ribs, 17 perpendicular to the first levees 16 are formed on the bus bar cover 12', and reinforcing protrusions 18 are formed at respective intersection portions of the first levees 16 and the second levees 17. Accordingly, the bus bar cover 12' has decreased thickness but has increased strength due to the first and second levees 16 and 17 and the reinforcing protrusions 18, so that an overall weight of a battery module may be reduced. In other embodiments, the reinforcing members may have various configurations. For example, in one embodiment, first and second ribs may extend in directions that are not perpendicular to each another.

Figure 8:
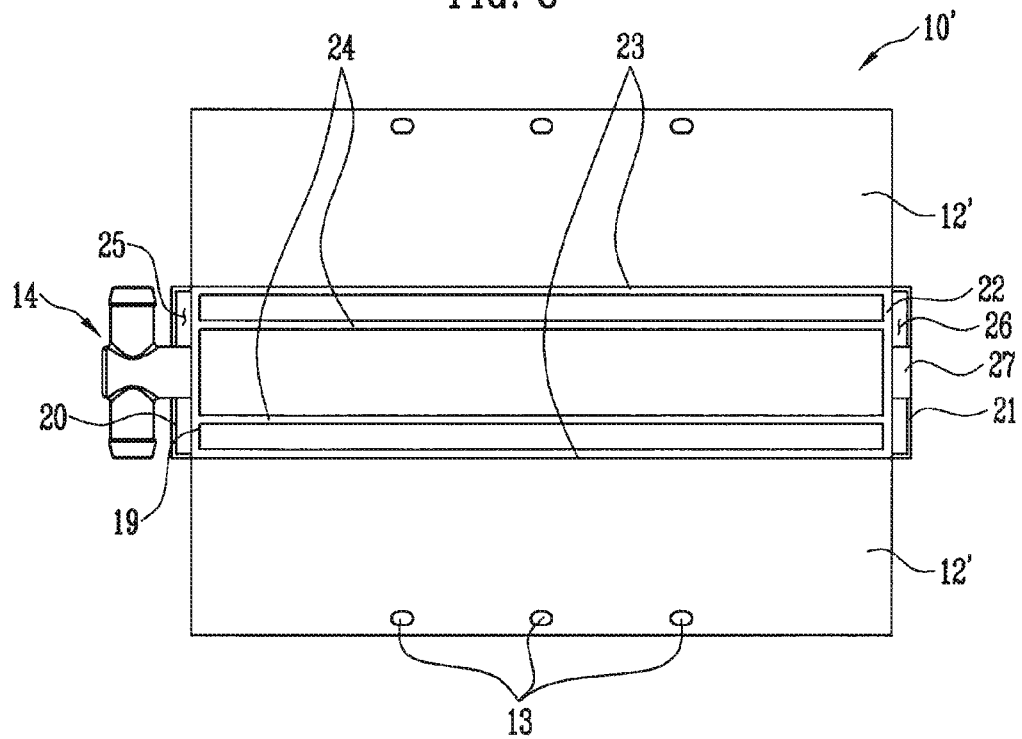
FIG. 8 is a bottom view of the battery module cover of FIG. 5.

Referring to FIGS. 7 and 8, the degassing cover 11' includes a first extension part 19 and a second extension part 22 which extend to a vent or an insulating member disposed on an upper part of the vent, and a pair of first walls 23 is formed to extend between the first extension part 19 and the second extension part 22, and a pair of second walls 24 is further formed between the first walls 23 to securely cover the vent or the insulating member disposed on the upper part of the vent. That is, in one embodiment, a plurality of layers of walls are formed on the degassing cover 11' to better prevent gas discharged through the vent from leaking to another side other than through an exhaust part 14. Further, while two pairs of walls (i.e. the first walls 23 and the second walls 24) are described above and shown in FIGS. 7 and 8, in other embodiments, more or fewer walls may be formed depending on a size of the battery module and the vent and a number of vents in order to provide suitable sealing.

Referring to FIGS. 7 and 8, a first accommodation wall 20 and a second accommodation wall 21 may be formed outside the degassing cover 11' of the battery module cover 10' adjacent to the first extension part 19 and the second extension part 22, respectively. Here, a first accommodation space 25 is formed between the first extension part 19 and the first accommodation wall 20, and a second accommodation space 26 is formed between the second extension part 22 and the second accommodation wall 21. Here, the second accommodation wall 21 adjacent to the second extension part 22 may have various shapes depending on a shape of an end plate of the battery module. In one embodiment, the second accommodation wall 21 includes a protrusion 27 having a semicircular shape (see FIG. 7) for covering a connecting hole 112 (see FIG. 10) to facilitate coupling with a projection 111 (see FIG. 10) having the connecting hole 112 of the end plate and to prevent or substantially prevent leakage of gas through the connecting hole 112.

Figure 9:
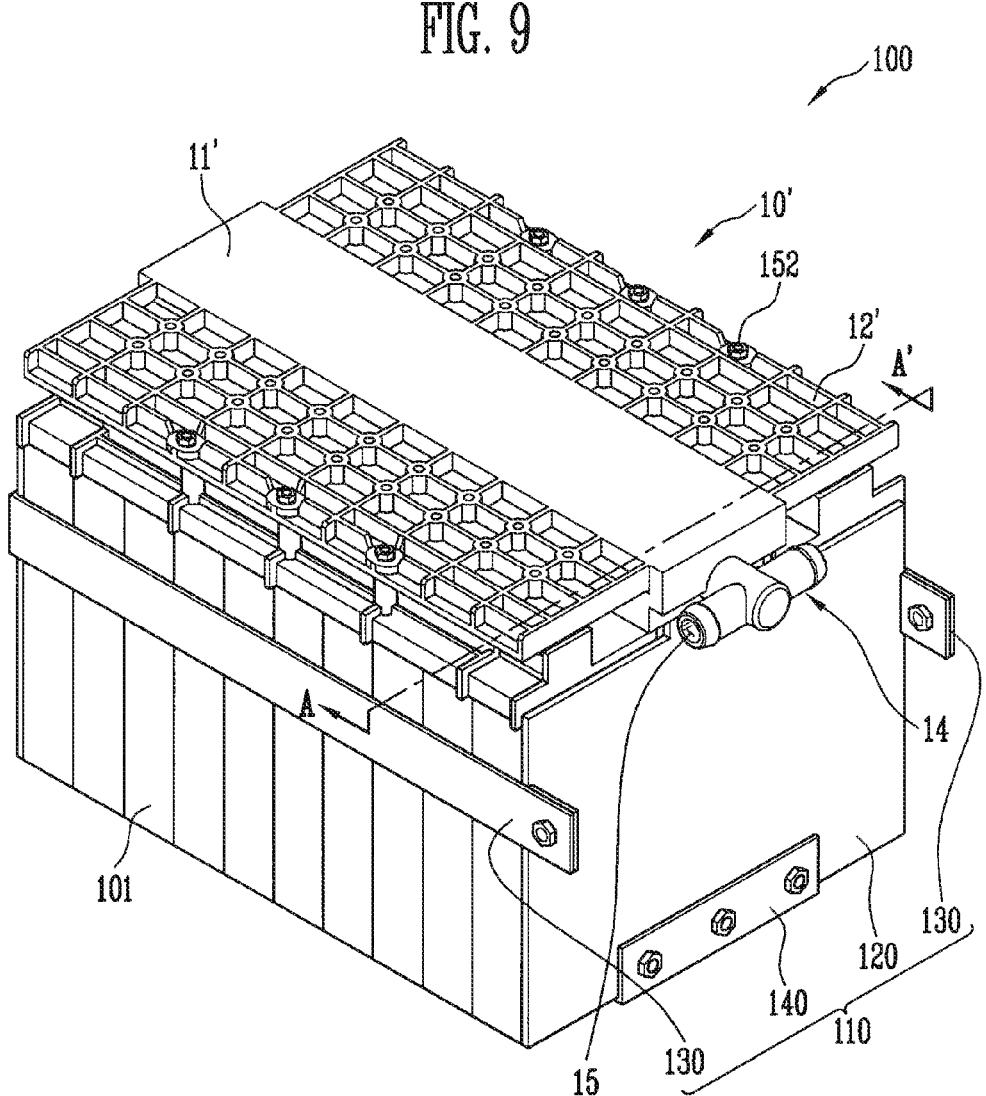
FIG. 9 is a top perspective view of a battery module including the battery module cover of FIG. 5.
Figure 10:
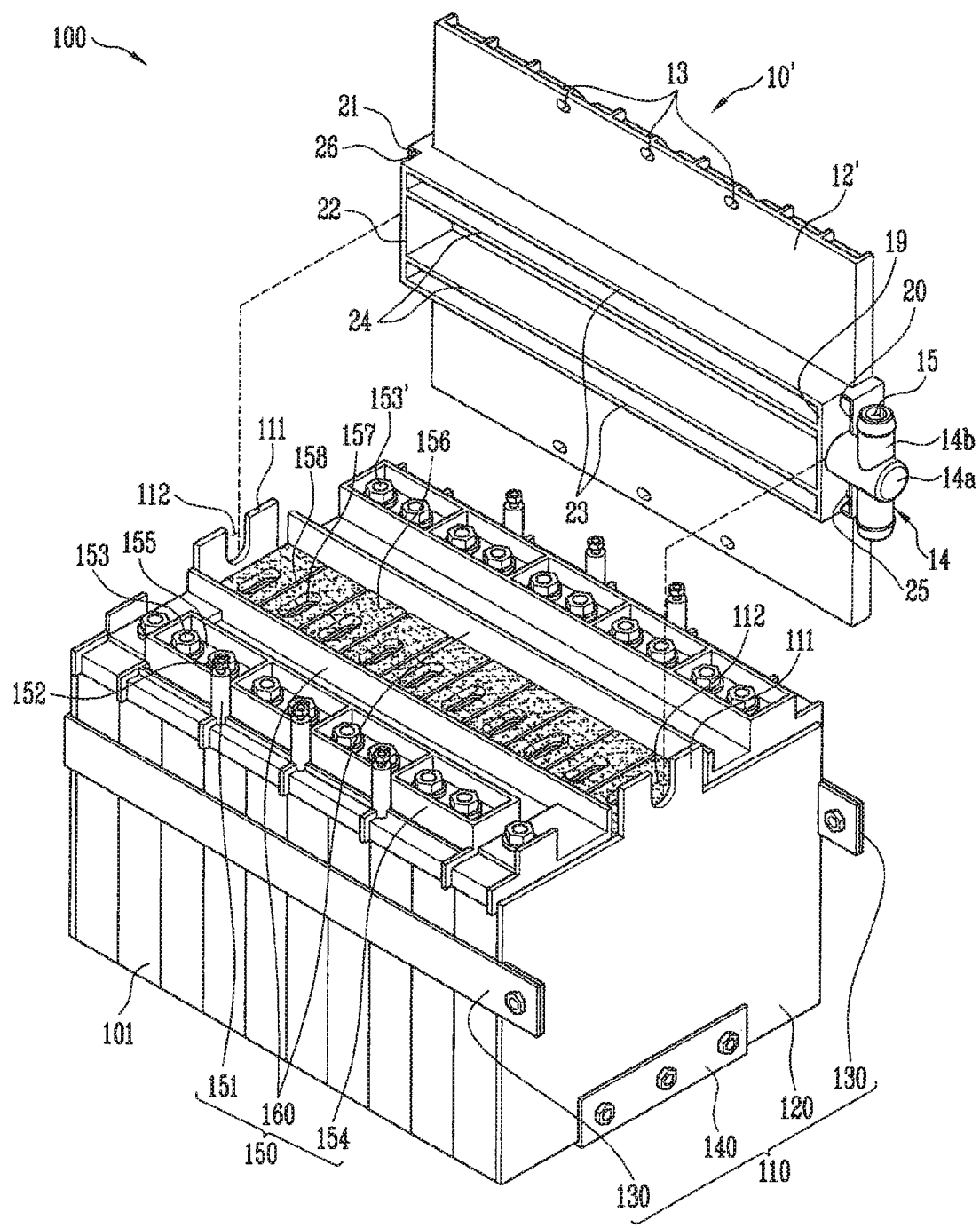
FIG. 10 is a top perspective view of the battery module of FIG. 9 showing the battery module cover removed.
Figure 11:
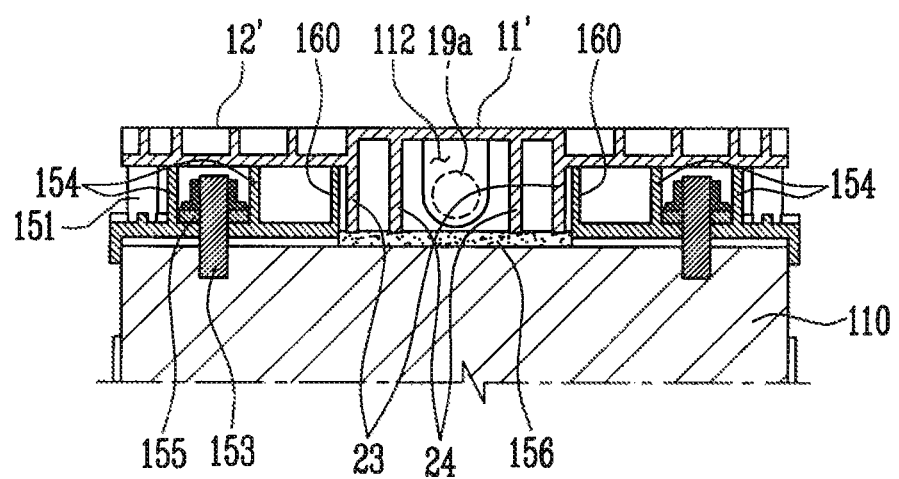
FIG. 11 is a partial cross-sectional view of the battery module of FIG. 9, taken along the line A-A'.

FIG. 9 is a top perspective view of a battery module including a battery module cover according to an exemplary embodiment of the present invention. FIG. 10 is a top perspective view of the battery module showing the battery module cover removed, and FIG. 11 is a cross-sectional view, taken along the line A-A' of FIG. 9.

Referring to FIGS. 9 and 10, a battery module 100 according to an embodiment of the present invention includes a plurality of battery cells 101 arranged in a direction and including a vent 157; one or more insulating members 156 disposed in an area where the vents 157 are formed and including an opening corresponding to the vent 157; a housing 110 accommodating the battery cells 101; and the battery module cover 10' mounted on the battery cells 101, wherein the battery module cover 10' includes the degassing cover 11' and the bus bar cover 12' formed in an integrated form. While in one embodiment, the battery module 100 includes the battery module cover 10', in another embodiment, the battery module 100 may include the battery module cover 10.

In one embodiment, the battery cells 101 are lithium ion secondary batteries having a polygonal shape, as an illustrative example. However, embodiments of the battery module 100 are not limited thereto and, in other embodiments, may include battery cells of different materials and/or configurations. That is, embodiments of the present invention may be applied to various types of batteries, such as a lithium polymer battery or a cylindrical battery.

The battery cells 101 may include a battery case having an opening and a cap plate covering the opening. The battery case accommodates an electrode assembly including a positive plate, a negative plate, a separator interposed between the plates, and an electrolyte. In one embodiment, a positive terminal 153 connected to the positive plate and a negative terminal 153' connected to the negative plate are formed to protrude to the outside on opposite ends of the cap plate, and the positive terminal 153 and the negative terminal 153' may be electrically connected by a bus bar 155. The positive plate and the negative plate of the electrode assembly react with the electrolyte to generate energy, and the energy is transmitted to the outside through the positive terminal 153 and the negative terminal 153'. A positive terminal 153 and a negative terminal 153' of two neighboring battery cells 101 may be electrically connected through the bus bar 155 formed of nickel or the like. In one embodiment, a blocking wall 154 is formed to surround the pair of positive and negative terminals 153 and 153' connected via the bus bar 155, thereby preventing or substantially preventing a short circuit between adjacent ones of the terminals 153, 153'. In one embodiment, a fixing member 151 is formed at one side of the blocking wall 154 to fix a coupling component 152, such as a bolt, inserted into an insertion hole 13 of the battery module cover 10'.

In one embodiment, the vent 157 is formed between the positive terminal 153 and the negative terminal 153'. When gas generated in the battery cells 101 has a pressure of a predetermined amount or greater, the vent 157 may function as a path through which the gas is discharged out of the battery cells 101 to prevent the battery cells 101 from being destroyed due to internal pressure. In one embodiment, the plurality of battery cells 101 are arranged in a first direction, and the battery cells 101 are arranged side by side so that large front sides of the battery cells 101 face each other. In one embodiment, the vents 157 are disposed at center portions of the respective battery cells 101, and the vents 157 are arranged approximately in a straight line along the battery cells 101. In one embodiment, the insulating member 156, such as a gasket, including an opening is positioned on each vent 157. The insulating member 156 is arranged in each battery cell 101 so that the opening is disposed corresponding to the vent 157. A levee, or rib, 158 may be formed between the insulating members 156 to position the insulating member 156 with respect to the vent 157.

A pair of isolation layers 160 may be formed on opposite sides of the insulating members 156 to support the battery module cover 10' from a bottom side thereof. In one embodiment, the pair of isolation layers 160 supports the battery module cover 10' from the bottom and guides the degassing cover 11' and the bus bar cover 12' of the battery module cover 10' to a mounted position. Further, the insulating members 156 are disposed between the pair of the isolation layers 160 to allow the insulating members 156 to be easily positioned.

In one embodiment, the isolation layers 160, the blocking wall 154 surrounding the bus bar 155 to connect neighboring terminals 153, 153', and the fixing member 151 formed at one side of the blocking wall 154 may be integrated to constitute an upper cover 150, thereby improving efficiency in assembling the battery module 100.

The housing 110, in one embodiment, includes a pair of end plates 120 spaced apart from each other in one direction (e.g., the first direction), a lateral side connecting member 130 connecting lateral sides of the end plates 120, and a bottom plate 140 connecting bottom sides of the end plates 120. In one embodiment, the plurality of battery cells 101 are accommodated between the pair of end plates 120, and the end plates 120 are disposed to be in contact with an outer side of each outermost battery 101 and press the battery cells 101 inward. The lateral side connecting member 130 is connected to one end and to another end of the end plates 120 to support opposite sides of the battery cells 101. A bottom side of the battery cells 101 may be supported by the bottom plate 140, in which opposite ends of the bottom plate 140 are connected to the end plates 120.

The plurality of battery cells 101 supported by the end plates 120, the lateral side connecting member 130, and the bottom plate 140 may be arranged therein so that positive terminals 153 and negative terminals 153' are disposed alternately and may be connected in series using the bas bar 155. A positive terminal 153 or a negative terminal 153' of the outermost battery cell 101 may be used as a high current terminal. In embodiments of the present invention, a connection structure and a number of battery cells 101 may be modified depending on a design of the battery module 100.

In one embodiment, the integrated battery module cover 10, 10' is mounted on the insulating member 156, such as a gasket, and the bus bar 155. As described above, in one embodiment, the battery module cover 10, 10' includes the degassing cover 11, 11' and the bus bar cover 12, 12' in an integrated form and is mounted on the insulating member 156 and the bus bar 155. The degassing cover 11, 11' of the battery module cover 10, 10' has at least one pair of the walls 23 and 24 extending from a lower part (e.g., a bottom side) and sealing an upper part of the insulating member 156. Thus, a sealed space is formed between the insulating member 156 and the first walls 23 to provide a path for gas discharged from the vent 157. In one embodiment, the pair of second walls 24 is formed, in addition, inside the first walls 23 to more thoroughly prevent gas from leaking from the sealed space to the outside. A path for discharged gas is formed between the degassing cover 11, 11' of the battery module cover 10, 10' and the insulating member 156, and the gas discharged from the vents 157 flows to the inside discharge hole 19a formed in the first extension part 19 of the degassing cover 11, 11' and then is discharged to the outside through at least one external discharge hole 15 of the exhaust part 14 protruding on an external lateral side of the degassing cover 11, 11'.

As described above, the exhaust part 14, in one embodiment, has a "T" shape in which a first member 14a extends in a direction parallel with the path of gas, and a second member 14b extends on opposite sides of the first member 14a in a direction perpendicular to the first member 14a and has opposite end portions formed with the outside discharge holes 15. If gas discharged from the battery cell 101 flows to an adjacent battery cell 101 or an adjacent battery module 100, the gas may damage the adjacent battery cell 101 or the adjacent battery module 100. Thus, the path of gas is formed in a direction parallel with the end plates 120 to safely discharge the gas to the outside. That is, it is important to safely discharge the gas discharged through the vent 157 to the outside through the exhaust part 14 formed on one side of the degassing cover 11, 11' of the battery module cover 10, 10'. Thus, in one embodiment, the exhaust part 14 is formed to have a "T" shape constituted by the first member 14a and the second member 14b formed to extend on the opposite sides of the first member 14a perpendicular to the first member 14a, so that gas discharged through the exhaust part 14 may be discharged to left and right sides parallel with the end plates 120.

The battery module 100 may be used as part of a plurality of connected battery modules 100 for providing high power. The plurality of battery modules 100 in the set may be connected so that end plates 120 of neighboring battery modules 100 face each other. Further, a space between neighboring battery modules 100 is formed to be small in order to reduce a volume of the plurality of battery modules 100. In one embodiment, since the exhaust part 14 of the battery module cover 10, 10' is formed in a "T" shape, gas discharged through the exhaust part 14 is discharged separately to left and right sides parallel with the end plates 120, and thus the gas does not adversely affect an adjacent battery module 100.

FIG. 11 is a cross-sectional view taken along the line A-A' of FIG. 9. In the battery module 100 according to one embodiment, as shown in FIG. 11, a width of the insulating member 156 may be greater than a distance between the first walls 23 of the battery module cover 10, 10' or a distance between the second walls 24 of the battery module cover 10, 10' to improve sealing ability. Referring to FIGS. 10 and 11, in one embodiment, the projection 111 including the coupling hole 112 is formed in an upper part of one end plate 120 of the battery module 100 to be received in the first accommodation space 25 between the first extension part 19 and the first accommodation wall 20 of the degassing cover 11, 11'. Further, in one embodiment, a projection 111 including a coupling hole 112 in an upper part of the other end plate 120 is received in the second accommodation space 26 formed between the second extension part 21 and the second accommodation wall 22 of the degassing cover 11, 11'. Here, the projection 111 includes the coupling hole 112 connected to the inside discharge hole 19a formed in the first extension part 19 of the degassing cover 11, 11', and thus gas discharged from the vent 157 may be discharged through the outside discharge hole 15 via the coupling hole 112. Since the gas discharged through the vent 157 is discharged in one direction through the exhaust part 14 of the degassing cover 11, 11' of the battery module cover 10, 10', the gas is prevented or substantially prevented from leaking through the coupling hole 112 of the projection 111 to the second extension part 21 or the second accommodation wall 22 of the degassing cover 11, 11' where the exhaust part 14 is not formed. Thus, in one embodiment, the protrusion 27 which has a semicircular shape and covers the connecting hole 112 may be formed on the second accommodation wall 22 or the second extension part 21 to facilitate coupling with the projection 111 having the connecting hole 112 of the other end plate 120 and to prevent or substantially prevent leakage of gas through the connecting hole 112.

FIG. 12 is a schematic perspective view of a battery pack 200 in which a plurality of battery modules 100 are connected according to another exemplary embodiment of the present invention.

As shown in FIG. 12, a plurality of the battery modules 100 are arranged and manufactured into the battery pack 200. In one embodiment, in the battery pack 200, the T-shaped exhaust part 14 of the battery module cover 10, 10' may be connected to another T-shaped exhaust part 14 of a neighboring battery module 100 using a flexible communication pipe 30 or other suitable connection member. Here, gas generated in the vent flows in the degassing cover 11, 11' of the battery module cover 10, 10' in one direction and then is discharged to the exhaust part 14 protruding on an outside of the degassing cover 11, 11'. The gas flows through the flexible communication pipe 30 connecting the outside discharge hole 15 of the exhaust part 14 to an outside discharge hole 15 of the exhaust part 14 of a neighboring battery module 100. Here, the gas travels to right and left sides of the end plates 120 and in a parallel direction with the end plates 120, thereby leading the gas in a direction so that the gas does not damage an adjacent battery module 100 or an adjacent battery cell 101.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery module comprising:
   a plurality of battery cells arranged in a first direction from a first end of the battery module to a second end of the battery module, each of the battery cells comprising:
   a case including a vent;
   an electrode assembly housed in the case; and
   a terminal electrically coupled to the electrode assembly;
   a bus bar coupled between the terminals of adjacent battery cells of the plurality of battery cells; and
   a battery module cover covering the plurality of battery cells and comprising:
   a degassing cover comprising at least one protrusion extending from a surface of the degassing cover facing the plurality of battery cells, the at least one protrusion defining a cavity covering the vents of the plurality of battery cells and having a discharge opening in communication with the vents of the plurality of battery cells; and
   a bus bar cover covering the terminals of the plurality of battery cells and the bus bar, the bus bar cover extending from at least one of first and second opposite sides of the degassing cover between the first and second ends.

2. The battery module of claim 1, wherein the degassing cover and the bus bar cover are integrally formed.

3. The battery module of claim 1, wherein the degassing cover further comprises an exhaust part extending from the degassing cover at the first end of the battery module, and wherein the discharge opening is between the cavity and the exhaust part.

4. The battery module of claim 3, wherein the exhaust part comprises:
   a first exhaust portion extending from the degassing cover; and
   at least one second exhaust portion extending from the first exhaust portion in a direction perpendicular to the first exhaust portion, the at least one second exhaust portion having an exhaust opening at an end thereof.

5. The battery module of claim 1, further comprising insulating members adjacent the vents, wherein the at least one protrusion contacts the insulating members.

6. The battery module of claim 1, wherein the at least one protrusion comprises a first pair of ribs extending in the first direction and a second pair of ribs between the first pair of ribs and extending in the first direction.

7. The battery module of claim 1, further comprising a housing receiving the plurality of battery cells, the housing comprising:
   a pair of end plates contacting outermost battery cells of the plurality of battery cells at the first and second ends of the battery module; and
   a connecting member extending in the first direction and coupling the end plates to each other.

8. The battery module of claim 7, wherein an end plate of the pair of end plates comprises a projection extending toward the battery module cover and having an opening formed therein, the opening receiving an exhaust part extending from the degassing cover at the first end of the battery module.

9. The battery module of claim 8, wherein the battery module cover has an accommodation space at at least one of the first and second ends of the battery module and spaced apart from the cavity, and wherein the projection of the end plate is received in the accommodation space.

10. The battery module of claim 1, wherein the battery module cover comprises a plurality of ribs intersecting one another at reinforcing portions on a surface of the battery module cover.

11. The battery module of claim 1, wherein the bus bar cover comprises:
   a first bus bar cover portion extending from the first side of the degassing cover; and
   a second bus bar cover portion extending from the second side of the degassing cover.

12. The battery module of claim 1, further comprising an upper cover mounted between the plurality of battery cells and the battery module cover, the upper cover comprising at least one coupling member coupling the battery module cover to the plurality of battery cells.

13. The battery module of claim 12, wherein the upper cover further comprises a pair of isolation layers extending toward the battery module cover and along the first direction on opposite sides of the vents, wherein the isolation layers support the battery module cover.

14. A battery pack comprising:
   a plurality of battery modules arranged in a row and each comprising:
   a plurality of battery cells arranged in a first direction from a first end of the battery module to a second end of the battery module, each of the battery cells comprising:
   a case including a vent;
   an electrode assembly housed in the case; and
   a terminal electrically coupled to the electrode assembly;
   a bus bar coupled between the terminals of adjacent battery cells of the plurality of battery cells; and
   a battery module cover covering the plurality of battery cells and comprising:
   a degassing cover comprising at least one protrusion extending from a surface of the degassing cover facing the plurality of battery cells, the at least one protrusion defining a cavity covering the vents of the plurality of battery cells and having a discharge opening in communication with the vents of the plurality of battery cells, the degassing cover further comprising an exhaust part at the first end of the battery module; and
   a bus bar cover covering the terminals of the plurality of battery cells and the bus bar, the bus bar cover extending from at least one of first and second opposite sides of the degassing cover between the first and second ends, wherein the exhaust parts of adjacent battery modules of the plurality of battery modules are connected to one another.

15. The battery pack of claim 14,
wherein the exhaust part comprises:
- a first exhaust portion extending from the degassing cover; and
- a pair of second exhaust portions extending from the first exhaust portion in directions perpendicular to the first exhaust portion and opposite each other, the second exhaust portions having exhaust openings at ends thereof, and wherein the battery pack further comprises a connection member extending between respective exhaust openings of the adjacent battery modules.

* * * * *